Nov. 18, 1941.   O. F. RITZMANN   2,263,519
SEISMOGRAPH PROSPECTING APPARATUS
Filed Dec. 2, 1938   2 Sheets-Sheet 1

Inventor
O. F. Ritzmann,
By A. M. Houghton
his Attorney

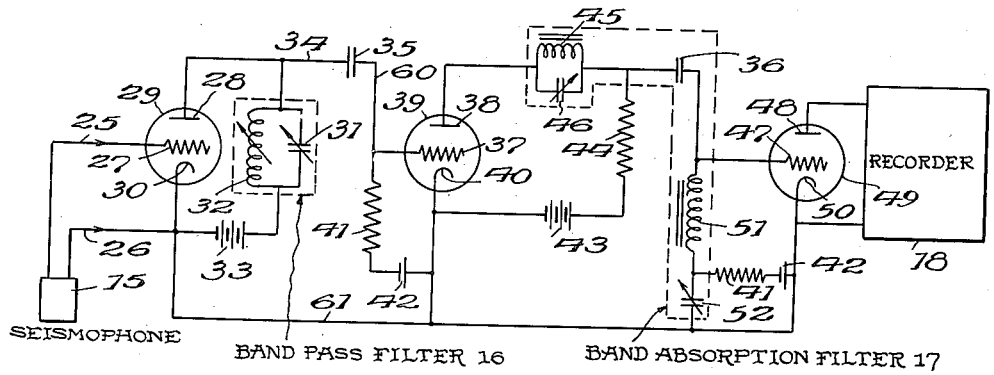
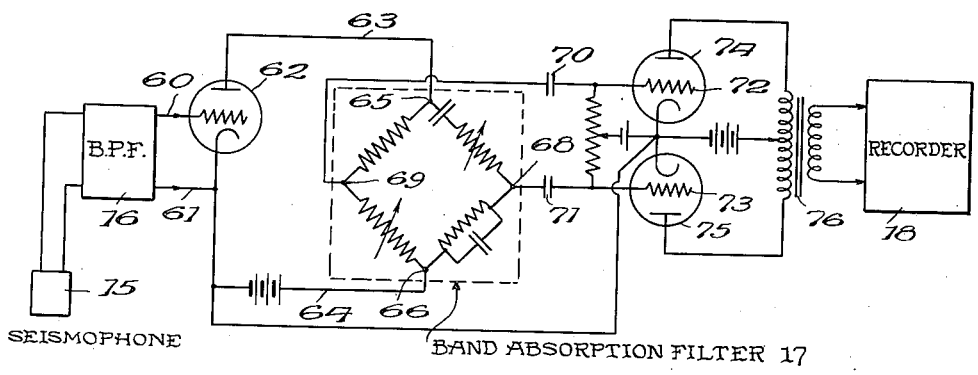
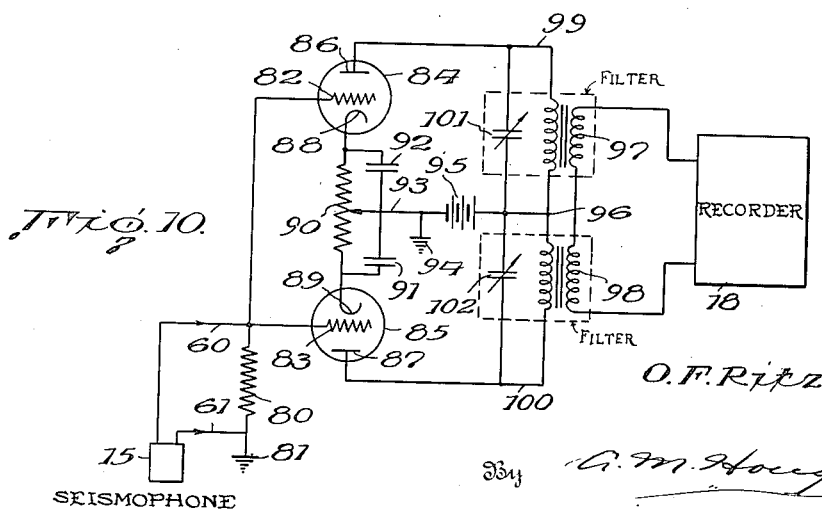

Patented Nov. 18, 1941

2,263,519

UNITED STATES PATENT OFFICE 2,263,519

SEISMOGRAPH PROSPECTING APPARATUS

Otto F. Ritzmann, Pittsburgh, Pa., assignor to Gulf Research & Development Company, Pittsburgh, Pa., a corporation of Delaware Application December 2, 1938, Serial No. 243,679

7 Claims. (Cl. 177—352)

This invention or discovery relates to seismograph prospecting apparatus; and it comprises in combination a seismophone adapted to produce oscillating signals of various frequencies on being subjected to terrestrial vibrations, separate independently adjustable band pass and band absorption filter means connected to the seismophone and constructed and arranged for substantially complete suppression of at least one undesired signal frequency and for transmission of desired signal frequencies, and means for recording the signals transmitted by the filter means; all as more fully hereinafter set forth and as claimed.

One object of the invention is the provision of a seismograph prospecting apparatus in which seismophone signals of desired frequency are recorded while signals of undesired frequency are suppressed to any predetermined degree, whatever their relative intensity with respect to the desired signals. Another object is the provision of a seismograph prospecting apparatus in which desired signal frequencies can be sharply selected and recorded and undesired signal frequencies suppressed, over a wide range of desired and undesired frequencies. Another object is the provision of a seismograph prospecting apparatus capable of sharp tuning while being simple in construction and operation.

In seismograph prospecting, a charge of explosives is fired at some point in the earth and the resulting terrestrial vibrations are detected at one or more points spaced from the source, and recorded. Detection is by electrical seismophones, often called seismic detectors, designed to produce an electrical signal corresponding to local earth movement, or to the velocity or acceleration of such movement. The electrical signal is amplified and the amplified signal is delivered to the recorder, where it is caused by suitable means to produce a permanent trace on photographic sensitized paper. From this permanent record, deductions can be made as to subsurface geological structure.

The waves received at the seismophones are of more or less definite frequencies (frequency is the number of wave vibrations per second) and it has been established for some time that best results are achieved when some signal frequencies are suppressed in the record, while the others are recorded. Just which frequencies it is best to suppress, and which to record, depends on the particular region being prospected, but in typical cases the desired frequency range may be say 40–80 cycles per second and there will be a disturbing or undesired frequency at the lower end of this range; or, less usually, within this range or above it. The undesired signal frequencies may be due to reflections from shallow strata of no interest, or to other causes, e. g. nearby vibrating machinery, highway traffic, etc., and may be very strong; even stronger than the desired signals. As stated, ordinarily the undesired signal frequencies are relatively low frequencies.

It is customary to provide seismograph amplifiers with a filter or equivalent tuning device, arranged to tune the amplifier to some desired band of frequencies and to filter out or suppress undesired signal frequencies. This expedient has not been found wholly satisfactory, because in some regions it has been impossible to get sufficient suppression of the undesired frequencies without at the same time also greatly weakening the record of the desired frequency.

Another expedient which has been proposed is to locate the detectors at positions in the earth along the direction of propagation of the undesired wave, and to space each detector apart from its neighbors by a distance equal to one-half the wave-length of the undesired wave, whereby the undesired wave is more or less effectively canceled. Locating the detectors at random in the plane of a wave front of the desired wave gives a similar result. These arrangements assume that the undesired (or desired) wave reaching all the detectors is the same in amplitude or in wave shape; but this is by no means always the case. Often the amplitude of the wave is materially different at the various detector positions, so that exact cancelation of the undesired wave-length is impossible, and moreover the wave shape is often different at the several detector positions, due to irregularities in the ground, which likewise precludes exact cancelation of undesirable waves. Accordingly these expedients often give indifferent results, which do not justify the considerable extra time and effort necessary to arrange the detectors at predetermined spacings.

According to the invention I provide a seismograph system in which an undesirable signal frequency or frequencies can be suppressed to any desired degree, or even completely extinguished, while desired frequencies are recorded with relatively little loss. The invention makes use of two adjustable electrical filters, one of the band pass type and the other of the band absorption type, arranged to supplement each other. The apparatus of the invention and its mode of operation will be clear from the extended description following.

In the accompanying drawings there are shown diagrammatically several examples of specific embodiments of apparatus within the purview of the invention, and chart diagrams illustrative of the mode of operation of the apparatus. Referring to the drawings:

Fig. 8 is a diagram showing one particular form of the system shown in Fig. 1;

Fig. 9 is a diagram of a modification corresponding to Fig. 6, and

Fig. 10 is a diagram of another modification corresponding to Fig. 6.

Figure 1:
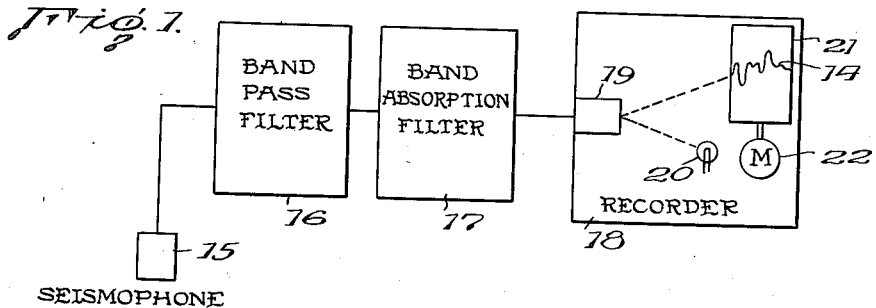
Fig. 1 is a schematic diagram of the complete system of the invention in its simplest or basic form, including a seismophone, a double filter and a seismograph recorder.
Figure 2:
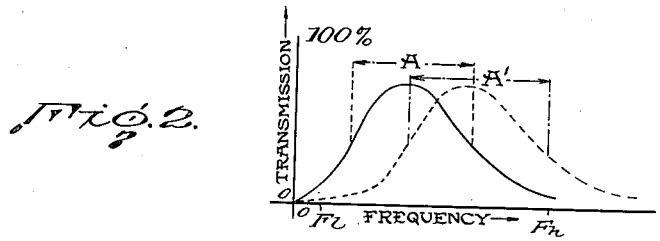
Fig. 2 is a chart showing frequency transmission characteristics of typical band pass filters.

Referring to the drawings, the invention in its simplest form is illustrated diagrammatically in Fig. 1 as including a seismic detector or seismophone 15 adapted to be set in the earth in a known way and to deliver an electrical signal corresponding to earth tremors, a band pass filter 16, a band absorption filter 17 and a seismograph recorder 18 comprising an oscillograph element 19 adapted to direct a focused beam of light from a lamp 20 on to a photographic sensitized paper or film 21 moved by a motor 22. Seismic vibrations at the seismophones produce an electric current which is transmitted to the oscillograph elements which vibrate at a rate and amplitude corresponding to the seismic vibrations, producing a wavy trace 14 on the paper as shown. Each of these elements is or can be of known type. Fig. 2 shows the characteristics of the band pass filter 16. The filter passes a band of frequencies, of more or less definite width; that is, signals of frequencies within the region of high transmission of the filter (under the hump in the curve), e. g. in the band indicated at A, are transmitted through the filter with relatively little weakening or attenuation, but frequencies outside this region, e. g. frequencies indicated at $Fl$ and $Fh$ are largely stopped by the filter. In tuning the filter for a different band, the effect is to shift the curve of Fig. 2 to the right or left; for example to the position shown in dotted lines, where a band $A'$ of generally higher frequencies is passed. The filter 16 can be tuned to transmit a given range or band of frequencies well, and to cut off frequencies above or below this range to a large extent; but a filter of this type cannot conveniently be made to sharply cut off frequencies outside a given band. Upon attempting to make the filter suppress frequencies $Fl$ and $Fh$ to a greater degree, the transmission in the desired band is also cut down proportionately and nothing is gained. This is a well-known characteristic of band pass filters and as stated has caused trouble in seismograph work because often the undesired frequency, say $Fl$, is very strong, and even when the transmission factor therefor is perhaps 1/100 or less with respect to the transmission factor for the desired frequencies, the signal may still be too strong.

Figure 3:
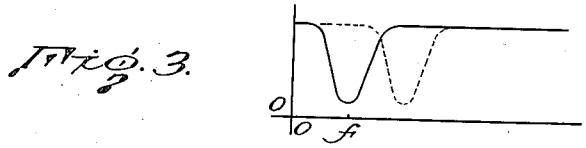
Figs. 3 and 4 are charts showing the frequency transmission characteristics of two types of band absorption filters.
Figure 5:
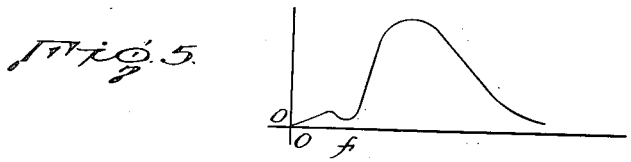
Figs. 5 and 6 are charts showing the frequency characteristics of two modifications of the invention combining band pass filters with two types of band absorption filters.
Figure 7:
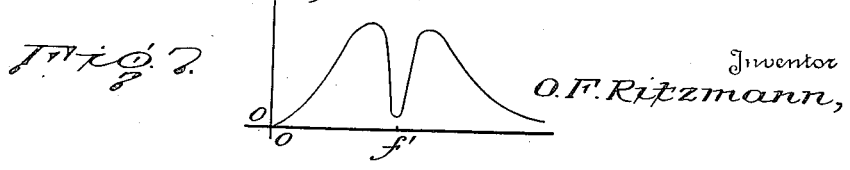
Fig. 7 is a chart showing how an undesired frequency intermediate a band of desired frequencies can be suppressed.

Fig. 3 shows the characteristics of one type of band rejection or absorption filter 17 useful in the apparatus of Fig. 1; the filter itself being described in detail in connection with Fig. 8. This type of filter is "opaque" to one frequency, or rather to a narrow band of frequencies, but it transmits other frequencies relatively without much loss, as is apparent from the chart, and accordingly is termed a band absorption filter. As is apparent from Fig. 1, I use the two filters 16 and 17 in series. Fig. 5 shows the net or effective transmission characteristic of the two filters together. Assuming it is desired to suppress some particular frequency $f$, the band absorption filter 17 is tuned to $f$, while the band pass filter is tuned to pass the desired range. Frequency $f$ is thereby substantially completely suppressed (Fig. 5). It should be noted that if the band pass filter transmits the undesired frequency $f$ to an extent of say 1/100, and the absorption filter transmits $f$ to an extent of say 1/50, then the net transmission of the two filters together for $f$ is only 1/50 × 1/100 or 0.0002 which is very low. In the combination of filters adjusted to give the characteristic shown in Fig. 5, the combination gives a quite sharp lower cutoff, as will be apparent on comparing Fig. 5 with Fig. 2. Sometimes the undesirable signal frequency is not at the lower end of the desired frequency band but is within the desired frequency band. In such case the undesired frequency can easily be suppressed by simply tuning filter 17 to that frequency. For example, referring to Fig. 7, an undesired signal frequency $f'$, due for example to a nearby pumping station engine, is eliminated by tuning filter 17 to it (as indicated by dotted lines in Fig. 3), the characteristic of the combination filter 16, 17 now appearing as in Fig. 7 with a sharp null or absorption band at $f'$.

Figure 4:
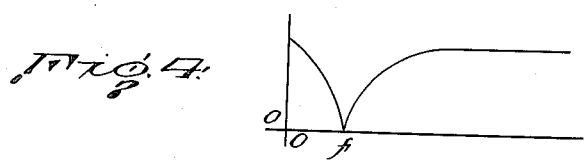

If the undesired signal frequency is excessively intense (of high amplitude or energy) with respect to the desired signal frequencies, I sometimes employ for filter 17 a filter of the extinction type, which gives complete (100 per cent) absorption for one particular frequency, the filter having a characteristic as indicated in Fig. 4. The combination filter 16, 17 then has the characteristic shown in Fig. 6, and the undesired frequency $f$ is completely suppressed. Frequencies slightly above or below $f$ are largely extinguished.

In all cases the filter transmission curves exhibit a minimum, at or near the disturbing frequency, and maxima on either side thereof, as shown.

Figs. 8 to 10 show the filter circuits in detail. While the simple arrangement of Fig. 1, without amplifiers, is sometimes feasible, in most cases in practice, the signal is amplified before being applied to the recorder and the systems shown in Figs. 8, 9 and 10 all include amplifying means. Referring to Fig. 8, the complete system is shown including the seismophone 15, and two filters, amplifying means and the recorder 18. The electrical leads 25 and 26 from the seismophone are applied respectively to the grid 27 and cathode 30 of a triode amplifying tube 29, having a plate 28. (The heating filament for the cathode is omitted from the drawings, for the sake of clarity of showing.) The band pass filter includes a capacitance 31 and inductance 32 in parallel, connected across plate and cathode in series with a B battery 33 as shown. The plate is connected through a lead 34 and capacitance 35 with the grid 37 of a second triode tube 39 having a plate 38 and cathode 40. A grid leak 41 and battery 42 are connected across the tube in conventional manner. A B battery 43 and plate resistance 44 connect the cathode and the plate, an iron core inductance (choke coil) 45 and capacitance 46 in parallel therewith being connected in circuit as shown. The plate output is taken through a capacitance 36 to the grid 47 of a third triode tube 49 having plate 48 and cathode 50. Between the grid and cathode of tube 49 is a second iron-core inductance 51, a condenser 52, and a grid leak 41 and battery 42. The amplified output from tube 49 goes to the recorder 18 as shown.

In operation, one or both of elements 31 and 32 is adjusted to tune the filter to pass some desired frequency band, e. g. 50–80 cycles per second. Condenser 35 is taken of a suitable (small) capacitance to help attenuate low frequencies. Elements 45, 46, 51 and 52 make up the band absorption filter. Elements 45 and 46, and elements 51 and 52, are sharply tuned to give a response curve as in Fig. 3, and the combination of filters has a transmission curve as in Fig. 5.

Figure 6:
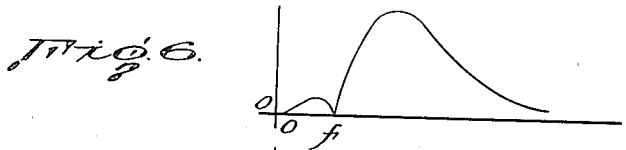

Fig. 9 shows a circuit having a frequency response curve as in Fig. 6. The seismophone 15 and band pass filter 16 are arranged as in Figs. 1 and 8. The output of the band pass filter is applied through leads 60 and 61 (see also Fig. 8) to a triode tube 62 which corresponds to tube 39 of Fig. 8 and which is conventionally arranged as an amplifier, connected through leads 63 and 64 to two poles 65 and 66 of a resistance-capacitance bridge, which serves as the band absorption filter 17. This bridge has the effect of completely extinguishing some one particular frequency (the extinguished frequency being determined at will by adjustment of the bridge). The other two poles of the bridge, 68 and 69 are connected through a pair of capacitances 70 and 71 with the grids 72 and 73 of a pair of triode tubes 74 and 75 arranged in a known way as a push-pull amplifier and delivering the amplified, filtered signal output through a transformer 76 to the recorder 18.

In the described embodiments of the invention a vacuum tube is arranged between the two filters which is usually advantageous as it minimizes the disturbing effect of each filter on the other. However, the intermediate tube can be omitted if desired; for example in Fig. 8 tube 39 can be omitted, and in Fig. 9 tube 62 can be omitted, leads 60 and 61 being attached directly to terminals 65 and 66 of the bridge 67.

Fig. 10 shows a simplified arrangement for providing an amplifier with the frequency response curve of Fig. 6. In effect two amplifiers are used, one tuned broadly to the desired frequency band and the other tuned sharply to the (single) undesired frequency; with their inputs connected in parallel and their outputs in push-pull, so that the outputs cancel when equal. In detail, seismophone leads 60 and 61 are resistance-shunted at 80, lead 61 being grounded at 81 and the other lead 60 being connected in parallel to the grids 82 and 83 of a pair of triode tubes 84 and 85 having plates 86 and 87 and cathodes 88 and 89. The cathodes are shunted through a potentiometer 90, the setting of which determines the relative amplification factor or gain of the two sides of the amplifier. Capacitances 91 and 92 are connected across the movable connection 93 of the potentiometer as shown. The movable connection is grounded at 94 and is connected through a battery 95 with the common input lead 96 of a pair of transformers 97 and 98, the other primary or input leads of which, 99 and 100, are connected respectively to plates 86 and 87. Variable capacitances 101 and 102 in parallel across the transformers serve for tuning means. The output of the transformer secondaries is applied in series to recorder 18 as shown. In operation, combination 97, 101 is tuned sharply, and combination 98, 102 is tuned broadly. Band absorption occurs because the output of the sharply tuned side is equal to the output of the broadly tuned side.

The invention is not limited to combinations of band pass and band absorption filters of particular types, but is useful with any suitable type of band pass and band absorption filters arranged in series as described. The particular filter circuits shown in Figs. 8, 9 and 10 are for the sake of illustration and exemplification. Furthermore, stages of amplification and detection can be added as desired, in known ways, in case more amplification is required than is furnished by the simple amplifier tubes shown. Usually only a single band absorption filter is employed, in conjunction with the band pass filter, but when it is wanted to eliminate more than one undesired signal frequency, other band absorption filters can simply be connected in series, before or after the band pass filter.

The apparatus is simple and flexible, readily lending itself to adjustment for varying seismographic conditions encountered in the field. The circuits are composed of standard circuit elements. Selection of inductances, capacitances and other circuit elements, of the proper size and characteristics, is within the expected skill of those versed in the art.

What I claim is:

1. In a seismograph prospecting apparatus including a seismophone adapted to produce electrical signals on being subjected to artificially produced terrestrial vibrations of relatively low frequency, said vibrations including some desired frequencies within a limited range and also including at least one frequency which it is desired to suppress and which lies within the range of desired signal frequencies, and said vibrations further including other frequencies beyond the desired range which other frequencies it is also desired to suppress, recording means and a circuit connecting the seismophone to the recording means; the improvement comprising band pass filter means in the circuit adapted to pass frequencies within the desired range and to suppress frequencies substantially higher and lower than the desired range, and separate adjustable filter means in the circuit tuned to cause attenuation of at least one disturbing frequency which is passed by the first-named filter means and which lies within the desired frequency range, said second-named filter means having such transmission characteristics as not to cause any substantial attenuation of frequencies other than said disturbing frequency; whereby all said undesired frequencies are suppressed by the filter while frequencies in the desired range are transmitted thereby.

2. In a seismograph prospecting apparatus including a seismophone adapted to produce electrical signals on being subjected to artificially produced terrestrial vibrations, said vibrations including some desired frequencies within a range of the order of magnitude of approximately 40 to 80 cycles and also including at least one frequency which it is desired to suppress and which lies within the range of desired signal frequencies, and said vibrations further including other frequencies beyond the desired range which other frequencies it is also desired to suppress, recording means and a circuit connecting the seismophone to the recording means: the improvement comprising band pass filter means in the circuit adapted to pass frequencies within the desired range and to suppress frequencies substantially higher and lower than the desired range, and separate adjustable narrow-band absorption filter means in the circuit, independently adjusted to attenuate at least one disturbing frequency which lies within the desired frequency range, while passing other frequencies within said desired range; whereby all said disturbing frequencies are suppressed while the desired frequencies are passed.

3. The apparatus of claim 2 wherein the band absorption filter means comprises a capacitance and choke coil in parallel to each other and in series relation to said circuit.

4. The apparatus of claim 2 wherein the band absorption filter means is of a type which attenuates a frequency band relatively narrow but of appreciable width.

5. The apparatus of claim 2 wherein the band absorption filter means is of a type completely extinguishing one single frequency, with high attenuation of frequencies closely adjacent the extinguished frequency.

6. Seismograph prospecting apparatus comprising in combination a seismophone adapted to produce electrical signals of various frequencies upon being subjected to seismic vibrations, a recorder, a circuit connecting the seismophone and the recorder, a band pass filter in said circuit arranged to pass a predetermined desired signal frequency band with progressively greater attenuation of frequencies outside the band, a push pull amplifier in said circuit comprising two tubes each having a cathode, a plate and at least one grid, and a band absorption filter comprising a four-terminal adjustable resistance capacitance bridge, two terminals of which are connected in said circuit so as to receive the seismophone signals and the other two terminals of which are connected respectively to a grid in each tube, and tuned to reject a narrow range of frequencies, which it is not desired to record, lying within the range of frequencies passed by the band pass filter; whereby a band of desired signal frequencies is delivered to the recorder and at least one frequency within said band is suppressed.

7. Seismograph prospecting apparatus comprising in combination a seismophone adapted to produce electrical signals of a range of frequencies upon being subjected to earth vibrations, said range including a band of frequencies which it is desired to record and other frequencies beyond said band which it is not desired to record and also at least one frequency within said range which it is not desired to record, a recorder, a circuit connecting the seismophone with the recorder, and amplifying and filtering means in said circuit including a pair of tubes connected in push-pull relation, each having a cathode, a plate and at least one grid, means for supplying signals from the seismophone to said grids, a pair of transformers each having a primary and a secondary, one side of each primary being connected to the plate of each of the tubes and the other side of each primary being connected to the cathodes of both tubes, means for connecting the transformer secondaries in series with the recorder, and a pair of condensers one shunted across the primary of each transformer, so that by adjustment of the condensers the said desired band of frequencies is delivered to the recorder while all said frequencies which it is not desired to record are suppressed.

OTTO F. RITZMANN.